United States Patent [19]

Moisson et al.

[11] Patent Number: 4,537,466
[45] Date of Patent: Aug. 27, 1985

[54] OPTICAL FIBER CHUCK INCLUDING A COVER COMPRISING AN IDLER WHEEL AND A V-SHAPED INSERT

[75] Inventors: Marc F. Moisson, Los Altos; Martin L. Wisecarver, Sonora, both of Calif.

[73] Assignee: Raychem Corporation, Menlo Park, Calif.

[21] Appl. No.: 466,683

[22] Filed: Feb. 15, 1983

[51] Int. Cl.³ .................. G02B 5/14; B25B 11/02
[52] U.S. Cl. ................. 350/96.20; 350/96.10; 350/96.21; 269/289 R; 269/289 MR; 269/315; 269/317; 269/902; 269/909
[58] Field of Search ............... 350/96.10, 96.15, 96.20, 350/96.21, 96.22; 269/165, 203, 204, 206, 216, 237, 289 R, 289 MR, 315, 317, 329, 900, 901, 902; 279/1 R, 1 SJ, 3, 9 R, 35, 41 R, 41 A, 106, 109

[56] References Cited

U.S. PATENT DOCUMENTS

| | | | |
|---|---|---|---|
| 2,455,024 | 11/1948 | Schneider | 269/902 |
| 3,969,016 | 7/1976 | Kaiser et al. | 350/96.15 |
| 4,046,298 | 9/1977 | Schroeder, Jr. | 350/96.20 |
| 4,079,927 | 3/1978 | Rocton | 269/903 |
| 4,151,030 | 4/1979 | Hensel | 350/96.20 |
| 4,421,721 | 12/1983 | Byer et al. | 156/617 M |
| 4,436,295 | 3/1984 | Wey et al. | 269/909 |

FOREIGN PATENT DOCUMENTS

| | | | |
|---|---|---|---|
| 55-52011 | 4/1980 | Japan | 350/96.21 |
| 56-39509 | 4/1981 | Japan | 350/96.20 |
| 57-4015 | 9/1982 | Japan | 350/96.20 |

OTHER PUBLICATIONS

Hatakeyama et al., "Fusion Splices for Single-Mode Optical Fibers" IEEE J. of Quant. Elect., vol. QE-14, No. 8, 8/78, pp. 614–619.
Kato et al., "Arc Fusion Splicing . . . Splice Machine" Applied Optics, vol. 21, No. 11, 6/82, pp. 1916–1921.
Evans et al., "Optical Fiber Alignment Tool" IBM Tech. Disclosure Bull., vol. 22, No. 2, pp. 686–687, 7/79.
Benson et al., "Optical Fiber Vacuum Chuck" Applied Optics, vol. 14, No. 4, 4/75, pp. 816–817.

Primary Examiner—William L. Sikes
Assistant Examiner—Brian M. Healy
Attorney, Agent, or Firm—Dennis E. Kovach; Herbert G. Burkard; T. Gene Dillahunty

[57] ABSTRACT

An optical fiber chuck for use in an optical fiber splicer may be both accurate and inexpensive because the fiber moves through a stationary chuck rather than a moving chuck carrying the fiber. The fiber slides between precision V-grooves, and is advanced and retracted by frictional engagement with a drive wheel.

7 Claims, 3 Drawing Figures

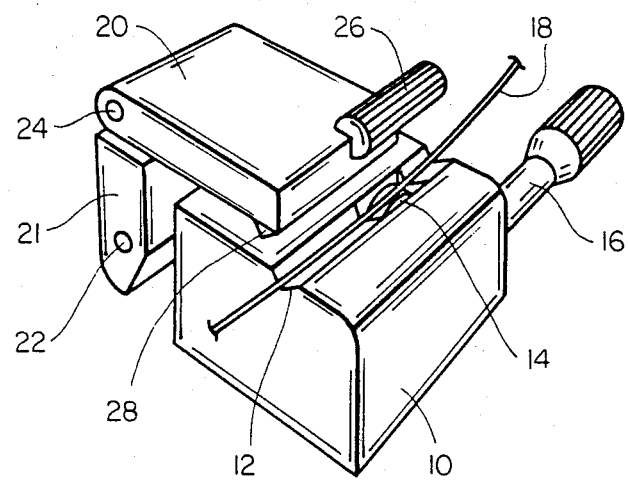
FIG_1
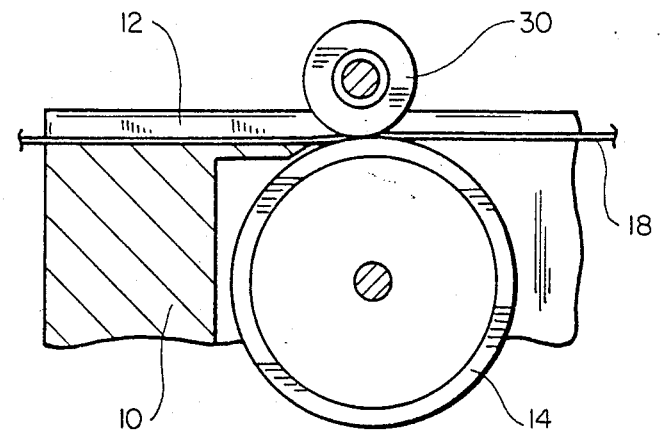
FIG_2
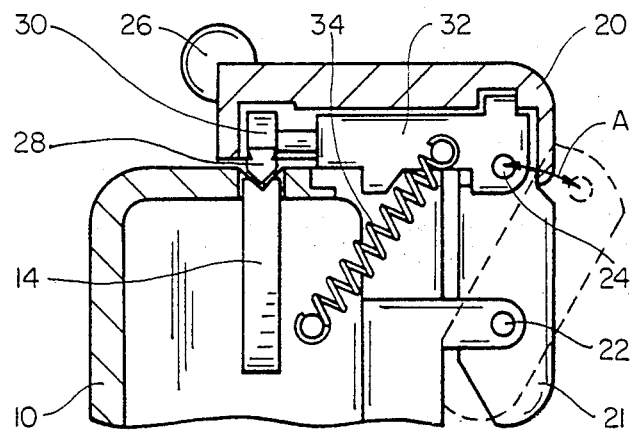
FIG_3

OPTICAL FIBER CHUCK INCLUDING A COVER COMPRISING AN IDLER WHEEL AND A V-SHAPED INSERT

BACKGROUND OF THE INVENTION

1. Field of the Invention

This invention relates to a chuck for optical fibers, especially to a chuck for use in an optical fiber splicer.

2. Introduction to the Invention

Various techniques have been proposed for the splicing of optical fibers, including fusion of the fiber ends together and adhesive joining using an index-matching adhesive.

Most of the techniques have relied on mechanical alignment of the fiber ends with respect to one another, such as by sliding them towards each other in a single V-groove. However, especially when it is desired not to strip the buffers from the fibers except near the very ends which are to be spliced, so that it is the outside surfaces of the buffers which are aligned, or when monomode fibers are to be spliced, the problem of lack of concentricity between the core and the cladding or buffer becomes serious.

It is then that a technique which aligns the cores of the optical fibers becomes valuable, and, since the cores are not accessible (except in plastic-clad fibers), the fibers must be movable laterally as well as longitudinally with respect to one another.

Micromanipulators capable of moving on up to three axis with the required precision (tenths of microns) are available, but are costly because of the need for precision components (slides, low-backlash gears, etc.) which move with respect to one another. Thus two chucks which can move with fibers held fixed in them to the required precision make for an expensive alignment system.

It is therefore desirable to develop a less costly precision alignment chuck for optical fibers, especially for use in a splicer.

DESCRIPTION OF THE INVENTION

Summary of the Invention

An optical fiber chuck in which the fiber is slidable along its longitudinal axis in a precision V-groove may be both accurate and inexpensive because the moving parts need only low precision while the high precision groove is stationary.

Brief Description of the Drawings

FIG. 1 is a perspective view of an optical fiber chuck according to this invention.

FIG. 2 is a cross-section along the V-groove of the chuck body, also showing the idler wheel.

FIG. 3 is a cross-section perpendicular to the V-groove.

Detailed Description of the Invention

We have discovered that by moving a fiber longitudinally in a chuck, it is possible to provide a chuck of lower cost and simpler construction with no loss of precision.

Accordingly, this invention provides an optical fiber chuck, comprising:

(a) a chuck body, having on its upper surface a straight V-groove into which an optical fiber can be loaded;

(b) a drive wheel, rotatably mounted on the chuck body such that a portion of its circumference intersects the V-groove in the chuck body to such an extent that it will engage a fiber loaded into the V-groove;

(c) drive means for rotating the drive wheel;

(d) a chuck cover, pivotably mounted on the chuck body between a loading position and an operating position;

(e) an idler wheel, rotatably mounted on the chuck cover such that when the chuck cover is in its operating position and a fiber is loaded into the V-groove of the chuck body, the idler wheel presses the fiber against the drive wheel to ensure adequate friction between the fiber and the drive wheel;

(f) a chuck cover insert, slidably mounted on the chuck cover, having a V-shaped lower surface, such that when the chuck cover is in its operating position the V-shaped lower surface of the insert enters the V-groove of the chuck body, the apex of the V-shaped lower surface being so shaped that it cooperates with the V-groove of the chuck body to hold a fiber which has been loaded into the V-groove; and (g) means for urging the chuck cover against the chuck body when the chuck cover is in its operating position.

Turning now to the drawing, FIG. 1 is a perspective view of an optical fiber chuck according to this invention.

The chuck body 10 has a straight V-groove 12 along its upper surface. This V-groove is of such a size and apex angle that it can easily accommodate an optical fiber. Mounted on the chuck body from its interior, so that its circumference intersects the V-groove 12, is a drive wheel 14. The drive wheel may be rotated by a drive means, such as a low-backlash gear system driven by a knob 16, which may be provided with a micrometer scale for indicating the extent of movement.

The chuck is shown in the loading position, with a fiber 18 lying in the V-groove, so that it may conveniently be seen how the drive wheel 14 engages the fiber surface.

The chuck cover 20 is pivotably linked to the chuck body by pivot link 21 and pivot axles 22 and 24. The cover has a handle 26 for moving it between the loading position and the operating position. The cover also has mounted on it an idler wheel (not shown in this Figure) wich urges a loaded fiber into contact with the drive wheel when the cover is in its operating position; and a V-shaped insert 28 which holds the fiber in the bottom of the V-groove 12 when the cover is in its operating position. The apex of the V-shaped insert 28 is shaped so as to retain the fiber in the bottom of the V-groove, either by being flat or having a small re-entrant portion. The materials of the V-groove and the V-shaped insert are chosen such that their surfaces have a low coefficient of friction with a fiber, while the wheel surfaces have a high coefficient of friction with the fiber to cause it to slide in the V-groove. The end of the V-groove opposite the end from which the fiber end to be spliced will protrude, ie. the end closest to the drive knob 16, may be made into a funnel shape to simplify loading, etc.

FIG. 2 is a partial cross-section along the V-groove of the idler body, also showing the idler wheel. As can be seen, the drive wheel 14, shown here as having a thin tire of an elastomeric material to enhance the friction between it and the fiber 18 is mounted in the chuck body 10 so that its circumference intersects the V- groove 12. The idler wheel 30, mounted in the cover, is shown here with the cover in operating position so that it presses the fiber against the drive wheel. It is also shown provided with an elastomeric tire. The idler wheel is shown here as offset from vertically above the drive wheel toward the end of the chuck from which the fiber end to be spliced will protrude. When the drive wheel is caused to rotate, the fiber slides longitudinally in the V-groove.

FIG. 3 is a cross-section perpendicular to the V-groove. It can be seen in this Figure how the cover may be mounted on the body. The pivot link 21 moves about pivot axis 22 between the operating position and the loading position (shown in phantom) so that pivot axis 24 moves in the direction of the arrow A.

The V-shaped insert 28 is seen engaged with V-groove 12. Idler wheel 30 is shown mounted on a carrier 32 in the cover 20, and urged by tension spring 34 into contact with drive wheel 14. The insert 28 and idler wheel 30 are preferably mounted independently on the cover so that the force each exerts on a fiber loaded into the V-groove may be separately adjusted.

With the cover in its loading position, there is ready access to the V-groove for loading a fiber therein; while, when the cover is in its operating position, the fiber is precisely aligned with respect to the chuck body.

A splicer which comprises two of these chucks may have them mounted on a common base if lateral adjustment of the fibers with respect to one another is not desired, in which case alignment of the V-grooves of the chucks need only be made once and permanently set.

Alternatively, if the fibers are to be capable of lateral adjustment, each chuck may be mounted to be capable of movement in one or two lateral axes (horizontal or vertical, for example). For example, one chuck may be capable of a horizontal translation perpendicular to the fiber axis an the other capable of a vertical translation; or, for example, each chuck may be pivoted about an axis parallel to the fiber axis so that their area of travel intersect.

However, because the longitudinal axis motion is performed by the fiber alone, rather than by the chuck, an yet with no loss of precision, the cost of the chucks may be below that of conventional multi-axis chucks. Also, the fiber longitudinal translation range is much greater than that of a chuck, with the only loss of orientation being due to such bending as the fiber undergoes under the force of gravity acting on its free end, which is small.

Suitable materials for the chuck components include metals and rigid thermoplastics. A preferred material is aluminum, for ease of manufacture and light weight. To obtain suitably low friction in the V-groove and the insert, aluminum may be, for example, silicone anodized; or any material may be coated with a low friction coating such as a silicone or fluorocarbon.

Although this invention has been discussed in detail with respect to a certain preferred embodiment, it is to be understood that its scope is not limited to that embodiment but only by the appended claims and their reasonable equivalents.

We claim:
1. An optical fiber chuck, comprising:
 (a) a chuck body having on its upper surface a straight V-groove into which an optical fiber can be loaded;
 (b) a drive wheel rotatably mounted on the chuck body such that a portion of its circumference intersects the V-groove in the chuck body to such an extent that it will engage a fiber loaded into the V-groove;
 (c) drive means for rotating the drive wheel;
 (d) a chuck cover pivotably mounted on the chuck body between a loading position and an operating position;
 (e) an idler wheel rotatably mounted on the chuck cover such that when the chuck cover is in its operating position and a fiber is loaded into the V-groove of the chuck body, the idler wheel presses the fiber against the drive wheel to ensure adequate friction between the fiber and the drive wheel;
 (f) a chuck cover insert mounted in the chuck cover and having a V-shaped lower surface such that when the chuck cover is in its operating position the V-shaped lower surface of the insert enters the V-groove of the chuck body, the apex of the V-shaped lower surface being so shaped that it cooperates with the V-groove of the chuck body to hold a fiber which has been loaded into the V-groove; and
 (g) means for urging the chuck cover against the chuck body when the chuck cover is in its operating position.

2. The chuck of claim 1 wherein the material of which the V-groove and V-shaped surface of the chuck are composed has a low coefficient of friction with a fiber to be loaded therein.

3. The chuck of claim 1 wherein the circumference of at least one of the drive wheel and idler wheel comprises an elastomer.

4. The chuck of claim 1, further comprising means for pivotably mounting the chuck cover to the chuck body, the pivotably mounting means including a pivot link and first and second pivot axles.

5. The chuck of claim 4, wherein the idler wheel is offset vertically above the drive wheel.

6. The chuck of claim 1, further comprising a carrier located within the chuck cover, and means for mounting the idler wheel to the carrier, the urging means including a tension spring for urging the idler wheel into contact with the drive wheel when the chuck cover is in its operating position.

7. The chuck of claim 6, wherein the chuck cover insert and idler wheel are independently mounted on the chuck cover.

* * * * *